(12) United States Patent
Arnold et al.

(10) Patent No.: US 8,701,378 B2
(45) Date of Patent: Apr. 22, 2014

(54) DEVICE FOR DISPLACING MOWN CROP

(71) Applicant: Forage Innovations B.V., Maassluis (NL)

(72) Inventors: Martin Arnold, Steinlah (DE); Marc Rinkel, Meine (DE)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 13/632,242

(22) Filed: Oct. 1, 2012

(65) Prior Publication Data

US 2013/0025251 A1 Jan. 31, 2013

Related U.S. Application Data

(63) Continuation of application No. PCT/NL2011/000019, filed on Mar. 9, 2011.

(30) Foreign Application Priority Data

Mar. 29, 2010 (NL) ..................................... 1037836

(51) Int. Cl.
*A01D 78/00* (2006.01)

(52) U.S. Cl.
USPC .................................. 56/367; 56/370; 56/377

(58) Field of Classification Search
USPC ........... 56/365–367, 370, 377, 396, 192, 193, 56/314, 320, 369; 460/111
See application file for complete search history.

(56) References Cited

U.S. PATENT DOCUMENTS

| | | | | |
|---|---|---|---|---|
| 3,645,077 | A | * | 2/1972 | Hauser-Lienhard ............ 56/366 |
| 3,772,865 | A | * | 11/1973 | Ruprecht et al. ................ 56/192 |
| 3,896,613 | A | * | 7/1975 | van der Lely ................... 56/370 |
| 4,015,413 | A | * | 4/1977 | van der Plas et al. ........... 56/370 |
| 4,056,923 | A | * | 11/1977 | Zweegers ........................ 56/366 |
| 4,128,987 | A | * | 12/1978 | Zweegers ........................ 56/377 |
| 4,203,277 | A | * | 5/1980 | Kaetzel ........................... 56/377 |
| 4,346,549 | A | * | 8/1982 | Wattron et al. ................. 56/370 |
| 4,367,622 | A | * | 1/1983 | Aron et al. ...................... 56/364 |
| 4,453,376 | A | * | 6/1984 | Wattron et al. ................. 56/370 |
| 5,743,075 | A | * | 4/1998 | Aron et al. ...................... 56/366 |
| 7,380,393 | B2 | * | 6/2008 | Stutzmann ...................... 56/377 |
| 2002/0000083 | A1 | * | 1/2002 | Van den Engel ............... 56/365 |

FOREIGN PATENT DOCUMENTS

| | | |
|---|---|---|
| EP | 0779021 A1 | 6/1997 |
| EP | 1493321 A1 | 1/2005 |
| FR | 2405007 A1 | 5/1979 |

* cited by examiner

*Primary Examiner* — Thomas B Will
*Assistant Examiner* — Mai Nguyen
(74) *Attorney, Agent, or Firm* — Hoyng Monegier LLP; Coraline J. Haitjema; David P. Owen (57) ABSTRACT

A mobile rake device for displacing mown crop has a frame with a rake tool assembly that has a path-shaped working range and includes two rake tools with rake tines. In an operative position, the rake tools are arranged behind each other in a staggered manner in the direction of travel to provide two path parallel sections to achieve the path-shaped working range. The rake tools displace the mown crop located in the path section to one side in a flow of crop in order to form ultimately one final windrow. The rake tool assembly has an auxiliary displacing tool, that is arranged to throw the crop, which has been collected by the first rake tool in a flow of crop or in the form of a windrow, a pre-windrow, across the front of the next rake tool towards the final windrow to be formed.

21 Claims, 9 Drawing Sheets

DEVICE FOR DISPLACING MOWN CROP

CROSS REFERENCE TO RELATED APPLICATIONS

This application is a continuation of PCT application number PCT/NL2011/000019 filed on 9 Mar. 2011, which claims priority from Netherlands application number NL 1037836 filed on 29 Mar. 2010. Both applications are hereby incorporated by reference in their entireties.

BACKGROUND OF THE INVENTION

1. Field of the Invention

The invention relates to a device and a method for displacing mown crop. In particular, the invention relates to so-called mobile rake devices, provided with at least two rake wheels which are equal in construction. Each rake wheel comprises a rotor driven around a rotor point of rotation, from which rotor a number of arms extend outwardly, which arms are provided, near their outer ends, with rake pins or tines. The rotor centre line of each rake wheel extends through the rotor point of rotation and is oriented substantially vertically in the operative position of the rake wheel.

2. Description of the Related Art

As a result of the device being moved, each rake wheel has a strip-shaped working area and displaces the crop lying on the mowing field in that working area sidewardly, to form a windrow. The two rake wheels, which are rotated in the same direction, are arranged obliquely behind each other in the direction of travel, so that the—strip-shaped—working area of the rear rake wheel can be adjacent to the working area of the front rake wheel, in order thus to achieve together a path-shaped working range. The rear rake wheel should displace the (pre) windrow produced by the front rake wheel and the crop lying scattered in its strip-shaped working area further sidewardly, to form a final windrow. An example of such a device is shown in EP 0.779.021, which is hereby incorporated by reference in its entirety.

In this case, the rear rake wheel has to achieve a higher performance than the front rake wheel. For this reason, the rear rake wheel is sometimes driven by another number of arms and/or at another speed than the front rake wheel. In this case, several rake wheel embodiments have to be produced and kept in stock. The drive of both rake wheels should also be configured for this purpose.

BRIEF SUMMARY OF THE INVENTION

It is an object of the invention to provide a mobile rake device, by means of which the crop lying on the mowing field in the path-shaped working area can be displaced in a reliable manner to form a final windrow.

It is an object of the invention to provide a mobile rake device which is efficient and can have a construction which is modular to a significant extent.

It is an object of the invention to provide a mobile rake device which is compact.

In order to achieve at least one of these objects, the invention provides, from one aspect, a mobile rake device for displacing mown crop, comprising a frame with a rake tool assembly, wherein the rake tool assembly, when being moved, has a path-shaped working range and comprises two rake tools which are provided with rake tines and, in an operative position, are arranged obliquely behind each other in the direction of travel and provide, in the operative position, a first path section and a second path section parallel thereto, respectively, to achieve the path-shaped working range, wherein both rake tools are provided with a rotor having a rotor point of rotation with a drive for rotation of the rotor around the rotor point of rotation, in the same direction of rotation, and consequently of the rake tines according to associated orbits, in order to displace the mown crop located in the path section in question to one longitudinal side thereof, in a flow of crop, in order to form ultimately one final windrow, wherein the rake tool assembly additionally comprises a further tool for crop displacement, which further tool, when viewed in the direction of travel, is arranged between the rotor points of rotation of both rake tools, characterized in that the further tool is an auxiliary displacing tool whose largest horizontal dimension, when viewed in operative position and in a top view, is smaller than that of the first rake tool and than that of the second rake tool, wherein the auxiliary displacing tool is arranged to throw the crop, which has been collected by the first rake tool in a flow of crop or in the form of a windrow, a pre-windrow, across the front of the next rake tool towards the final windrow (Z) to be formed.

The advantage of such a device is that the rear one of the two rake tools is loaded to a lesser extent. This is a result of the fact that the crop delivered by the first and front rake tool of the rake tools in a flow of crop, need no longer be displaced by the next rake. The rear rake tool, which is consequently loaded to a lesser extent, can thus be designed and be active substantially according to the front rake tool and need not, as usually until now, be designed so as to have more rake tines or as a larger or heavier one. This results in that the rake tools of a rake can be substantially equal, so that a modular construction is possible.

The device according to the invention is less wide than rake devices known until now having three successive rotor rakes. Such a rake device is especially known as a six-rotor rake having three successive rotor rakes on both sides of a central boom and makes a central windrow. The object of such an existing rake device having three rake wheels arranged behind each other is to achieve a large path-shaped working range. However, the problem that each rake wheel following a foregoing rake wheel is loaded to a larger extent, is not solved by such existing rake devices. When applying the invention to such a six-rotor rake, on both sides of the central beam at least one auxiliary displacing tool could be arranged between two of the three successive rake wheels and in this manner at least one of the two rear rake wheels is unloaded.

According to an embodiment, in the device according to the invention, the mutual horizontal distance between the points of rotation of the rotors of both rake tools is smaller than twice the diameter of the orbit of the first and/or of the second rake tool. This has the advantage that the device can be designed as a compact one.

In a further embodiment, both rake tools are mounted on the frame in such a manner that, in the aforementioned operative position, the distance between the outer circumference of their orbits is smaller than the outer diameter, in particular is smaller than the radius, of the orbit of the first and/or of the second rake tool. This has the advantage that a compact construction of the tool is possible.

A further characteristic of the tool is that the auxiliary displacing tool differs in construction from the first and the second rake tool, and is in particular not a rake. In one embodiment, the auxiliary displacing tool comprises a rotor which is drivable about a rotor centre line and is provided with tines or pins which rotate according to an orbit, and the outer diameter of the rotor is smaller than the outer diameter of the orbit of the first and the second rake tool, in particular is smaller than the radius thereof, more in particular is smaller than half the radius thereof. An advantage of this embodiment is a further compactness of the rake device. In one embodiment, the pins have a fixed orientation with respect to the rotor centre line of the rotor of the auxiliary displacing tool.

According to a further characteristic, the rotational speed of the auxiliary displacing tool is preferably a multiple of that of the rake tools, is preferably at least five to ten times larger. An advantage is that the crop is thrown away and also that due to the high rotational speed the capacity and consequently the quantity of displaceable crop is larger, so that the second or rear rake tool need displace no crop or less extra crop.

The auxiliary displacing tool is advantageously designed so as to have pins which are located on a cylindrical or conical surface concentric with the rotor centre line or extend substantially radially, if desired also tangentially, from the rotor. As a result thereof, the crop to be displaced from the first or front rake tool is engaged when it has reached the ground and forms a pre-windrow or just before it touches the ground and is swung/thrown to the intended final windrow, across the front of the rear rake tool. As a result thereof, the rear rake tool is not or substantially not loaded by the crop displaced by the first or front rake.

The pins of the auxiliary displacing tool are advantageously designed as tedder pins having bent ends. Such a shape increases the throwing capacity of the auxiliary displacing tool.

In one embodiment, when viewed from above, the orbit of the pins of the auxiliary displacing tool is located completely beside the first path section. There is thus chosen an effective positioning in which the auxiliary displacing tool can engage and displace the crop displaced by the first or front rake tool. In a further embodiment, the rotor centre line of the auxiliary displacing tool, when viewed from above, is located outside the first path section.

In a further embodiment, when viewed from above, the orbit of the pins of the auxiliary displacing tool is located completely within the second path section. The advantage of this positioning is that the crop displaced by the first or front rake tool is efficiently engaged and displaced, also in the case of overlapping working path sections.

In a further embodiment, the auxiliary displacing tool is provided with means for setting the orientation (e.g., orientation setting mechanism) of the rotor centre line of the auxiliary displacing tool in the operative position thereof. As a result thereof, the point of engagement of the crop can be influenced and also the intensity of this engagement.

In a further embodiment, the device according to the invention is provided with means for setting the position (e.g., a position setting mechanism) of the auxiliary displacing tool with respect to the first and second rake tools, when viewed in a horizontal plane, in particular in a direction transverse to the direction of travel. This means that by correct positioning of the auxiliary displacing tool with respect to the first and second rake tools, the crop loading of the second rake tool decreases. In an embodiment thereof, the means for setting the position of the auxiliary displacing tool are linearly active along an arm of the frame which carries the auxiliary displacing tool.

Preferably, the device according to the invention is provided with means for setting the height (e.g., height setting mechanism) of the auxiliary displacing tool with respect to a ground surface.

In a preferred embodiment, the pins of the auxiliary displacing tool are designed as tedder pins, preferably having bent ends, by means of which a throwing effect can be achieved.

In one embodiment, the auxiliary displacing tool is suspended from the frame and can be brought into an operative position in which the pins are free from the ground and the entire mass of the auxiliary displacing tool is carried by the frame, so that no force from the ground itself is experienced.

In the operative position, the first and second rake tools can be located in a position in which the first and second path sections overlap each other, when viewed in a vertical plane of projection transverse to the direction of travel.

The frame can be provided at a front side with means for hitching to a tractor, wherein the auxiliary displacing tool is located behind the hitching means, when viewed in a direction parallel to the direction of travel.

In one embodiment, the frame comprises a main beam extending in the direction of travel, wherein the first and second rake tools are located at one side thereof.

In an extended version thereof, two assemblies of first and second rake tools with an auxiliary displacing tool are mounted on both sides of the main beam, in particular in a symmetric manner with respect to the main beam.

In another embodiment, the drive of the first rake tool is couplable to the auxiliary displacing tool for driving same. The drive of the second rake tool can then entirely be used for the second rake tool.

The first and the second rake tool can have orbits with corresponding outer diameters.

From a further aspect, the invention provides a method of raking mown crop lying scattered on a mowing field, wherein the crop is displaced by means of a device provided with a first and a second rake tool and moved along a path, to form one final windrow, wherein the first and the second rake tool correspond to each other in construction, wherein the crop is displaced by means of the first rake tool, in a first path section, to form a pre-windrow located at one side of said first path section, wherein the crop in the pre-windrow is thrown by means of an auxiliary displacing tool mounted on the device, following the first rake tool and differing in construction from the first and the second rake tool, across the front of the next rake tool towards the final windrow (Z) to be formed. The next rake tool can be the immediately next second rake tool or an immediately next additional rake tool.

In this case, an auxiliary displacing tool comprising a rotor provided with pins and first and second rake tools having rake pins rotating about a rotor centre line are preferably used, wherein the rotor of the auxiliary displacing tool is rotated at a higher number of revolutions than the number of revolutions at which the first and second rake tools are rotated.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings. The rake device 1 of FIGS. 1A-D comprises a frame 2 which substantially consists of a longitudinal girder 3 provided with a longitudinal centre line S, the rear side of said frame being provided with carriers 4 for wheels 5 and its front side being provided with hitching means 6 for hitching the device 1 to a non-shown tractor.

Figure 1A:
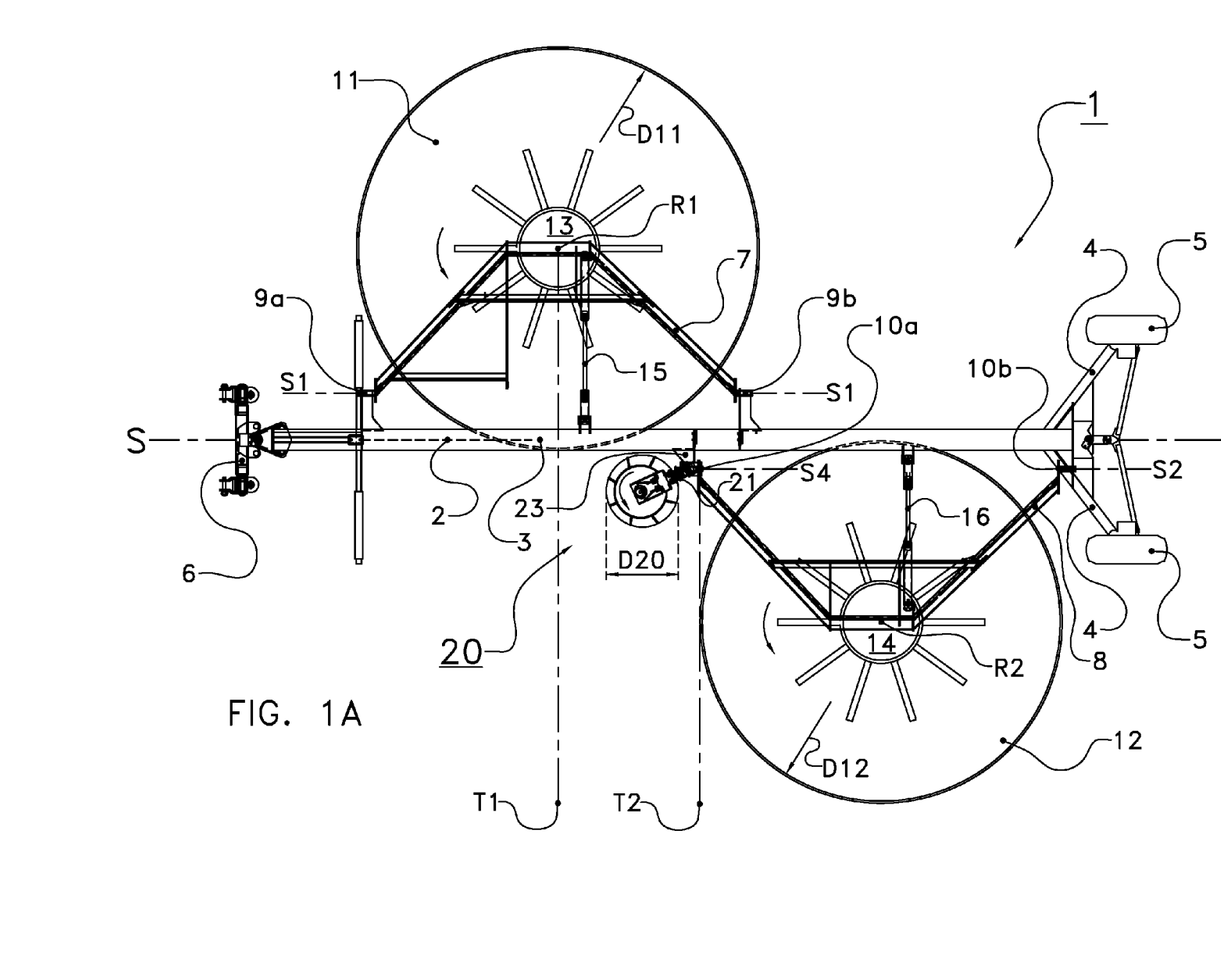
FIGS. 1A-D show a top view, a partial front view, a partial side view and a detail of a first exemplary embodiment, respectively, of a device according to the invention.
Figure 1B:
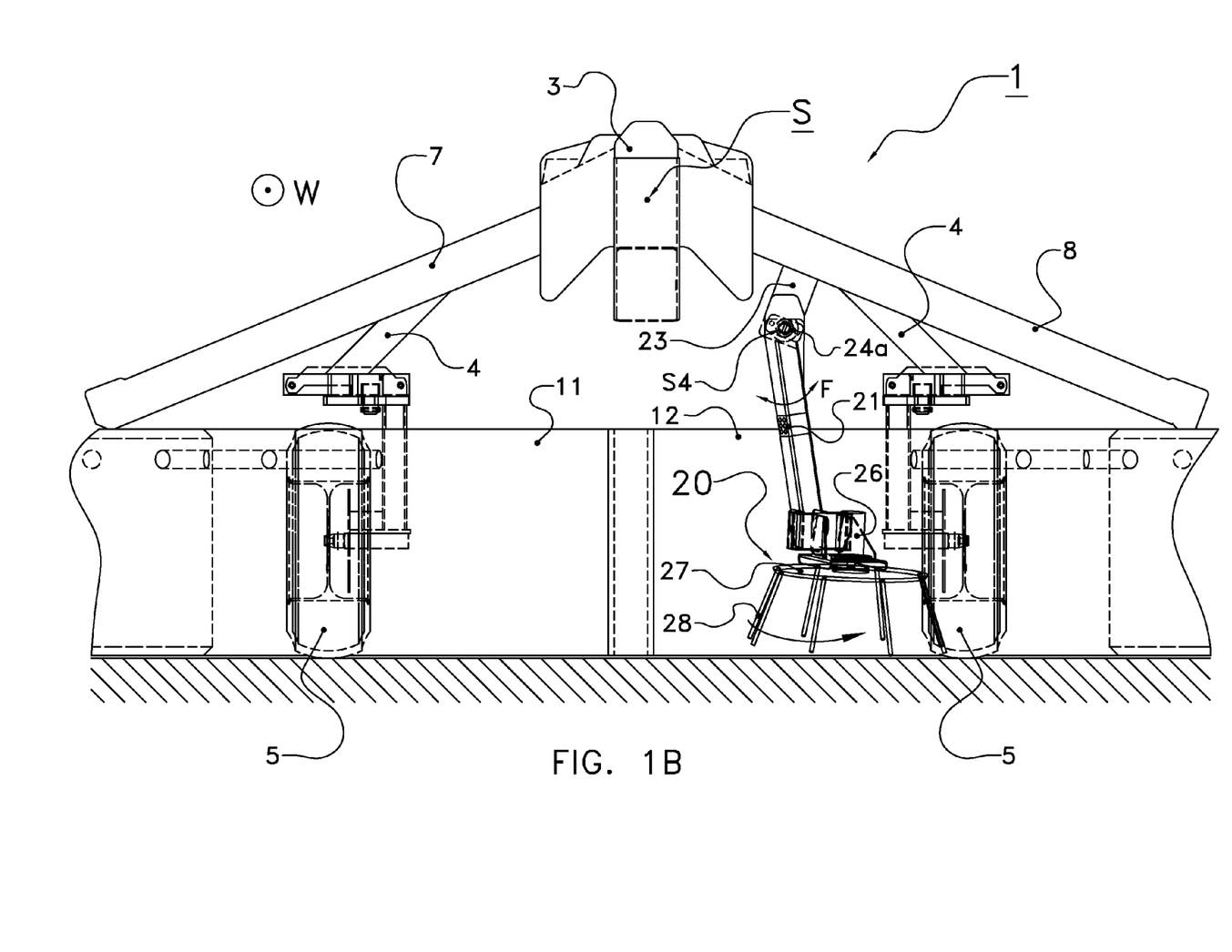
Figure 1C:
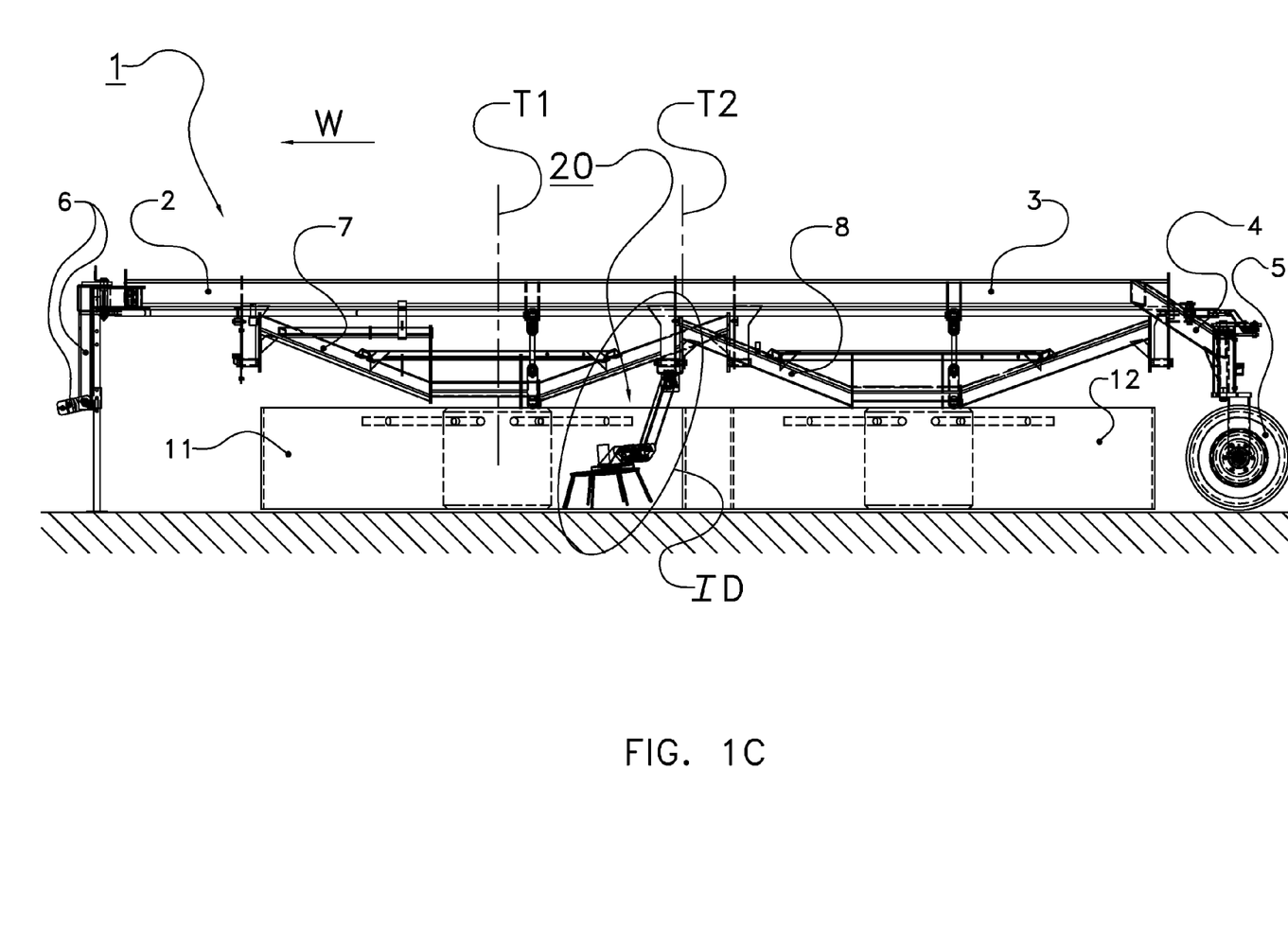

Substantially V-shaped spacers 7 and 8 mounted at opposite sides of the longitudinal girder 3 are pivotable, around horizontal pivot centre lines S1 and S2, respectively, in the region of hinges 9a,b and 10a,b, respectively, between a—shown—operative position and an upwardly pivoted transport position, by operating of cylinders 15,16. The spacers 7 and 8 each carry a circular rake arrangement 11,12, known per se, with rotors 13,14 having—in operative position—substantially vertical rotor centre lines R1 and R2. The circular rakes 11,12 each comprise a series of rake arms with groups of parallel rake tines provided at their ends, which are controllable in their position.

The circular rake 11 is located in front of the circular rake 12. Behind a vertical transverse plane T1, which intersects the rotor centre line R1, and in front of a vertical transverse plane T2, which is parallel to the transverse plane T1 and forms a tangent for the circular rake 12, there is mounted an auxiliary displacing tool 20 which is completely carried by and attached to the lower end of a carrier arm 21, which, in the region of connection 22a, is attached to a bracket 25a, which, in the region of an adjustable bolt connection 24b, is attached to a bracket 23, which is rigidly attached to the longitudinal girder 3, near the hinge 10a. The hinge connection 24a has a longitudinal centre line S4 parallel to S and is adjustable in the direction F in order to set the orientation of the arm 21 in a plane perpendicular to S4. By selecting the setting of the bolt connection 24b, the orientation of the carrier arm 21 in the horizontal plane, substantially about the vertical line S5, can be set.

The carrier arm 21 is a three-part arm, parts 21a,b,c, the parts 21a,b being in line with each other and being interconnected by means of a connection 22a. The part 21c is oriented substantially horizontally and is mounted to the part 21b by means of a connection 22c. The connections 22a-c comprise a plurality of connection holes for connecting bolts, so that these connections are adjustable. It is thus possible to set the angle of the carrier arm with respect to the bracket 25, the length of the carrier arm 21 and the angle between the arm parts 21b and 21c (see arrows E).

In this example, the auxiliary displacing tool 20 is designed as a disc 27 driven in a rotating manner by an electric motor 26 and provided with a series of straight tines or pins 28, which are located on a conical surface. The outer diameter of the auxiliary displacing tool 20, D20, is much smaller than the outer diameters D11, D12 (in this example equal to each other) of the circular rakes 11, 12. D11 and D12 can, for example, amount to 3-4 meters, and D20 can amount to approximately 0.5-1.5 meter. In this example, D20 is 0.5 meter smaller than half the radius of the circular rakes 11,12 (in this example, D11,D12=3 meters).

The rotational speed of auxiliary displacing tool 20 is a multiple of that of the circular rakes 11, 12, in this example approximately 10 times larger (40-60 rpm for circular rakes 11, 12 and 400-600 rpm for auxiliary displacing tool 20). All this depends, for example, on the number of tines and the diameter.

Figure 2:
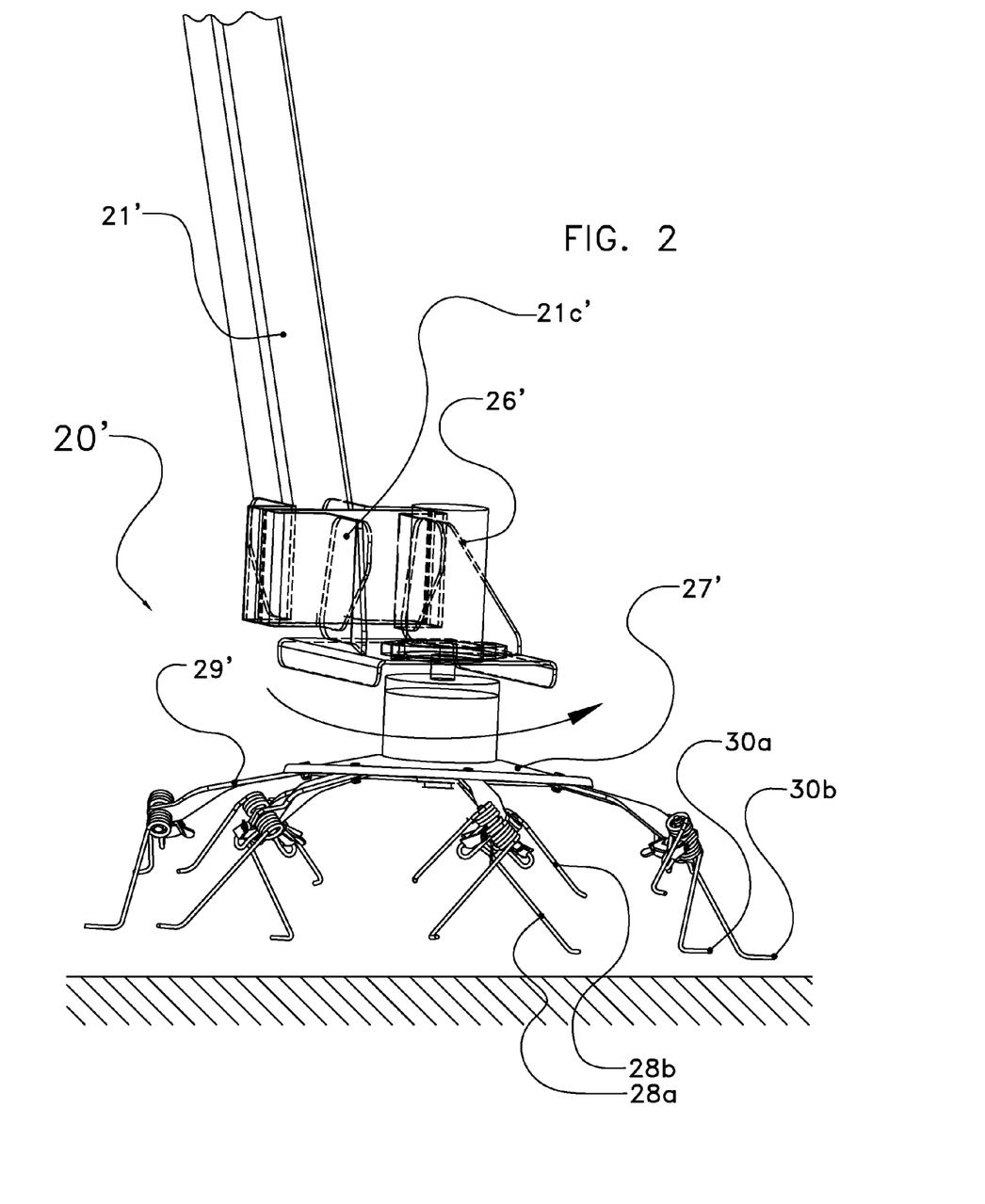
FIG. 2 shows a partial front view of an alternative embodiment of the device of FIG. 1.

An alternative design of the auxiliary displacing tool is denoted by 20' with carrier arm 21' in FIG. 2 and comprises an electric motor 26' which drives a disc 27' in rotation. The disc 27' is provided with a number of bent arms 29' extending substantially radially, at the ends of which in each case a pair of resiliently mounted tines 28a,b are mounted, which tines 28a,b are provided with bent tine ends 30a,b corresponding to the hook-shaped tines of the tedder sold by Lely (registered trademark) under the name of Lotus (registered trademark).

Figure 3A:
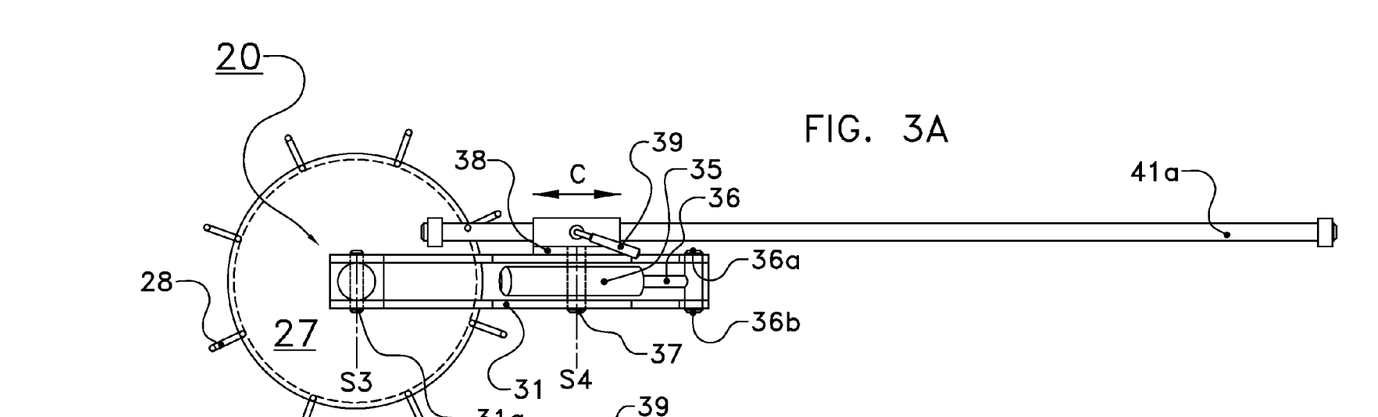
FIGS. 3A and 3B show a suspension of an auxiliary displacing tool intended to be implemented in a further exemplary embodiment of a device according to the invention, in a top view and a front view, respectively.
Figure 3B:
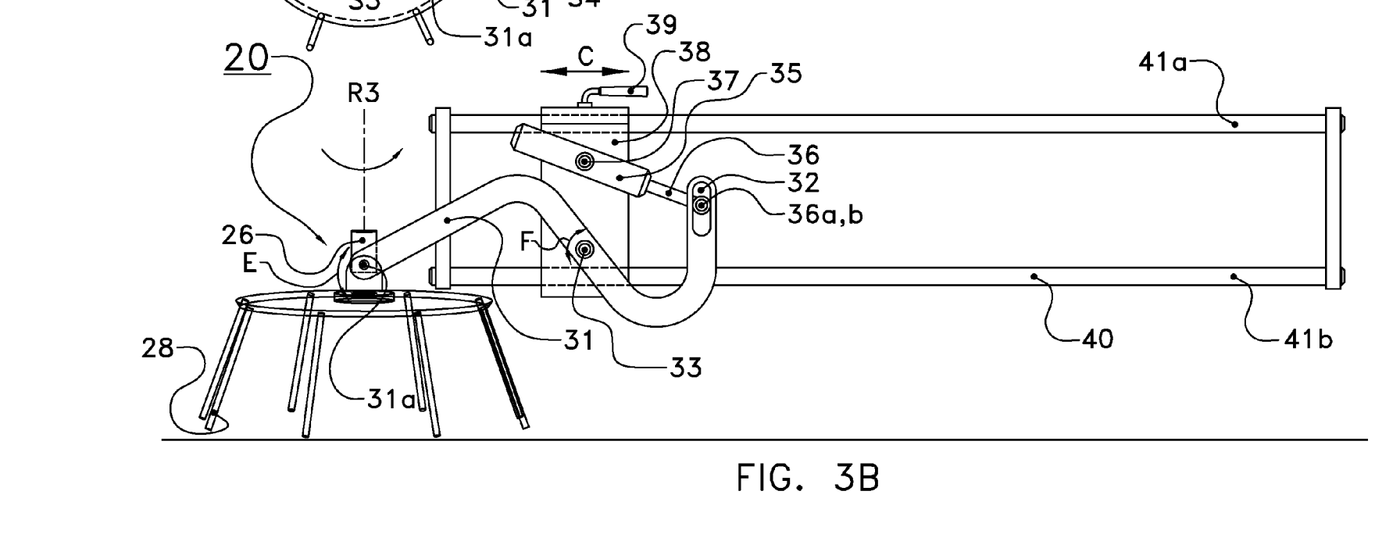

An alternative suspension for the auxiliary displacing tool 20 (or 20') is shown in FIG. 3. The auxiliary displacing tool 20 is mounted, in a manner in which it is rotatable about centre line S3 (arrows E) and in which it is adjustable, to one end 31a of a substantially S-shaped double lever 31, whose other end 31b is connected to the piston rod 36 of a cylinder 35. The cylinder 35 is mounted in a rotatable manner to the slide 38 via a rotating pin 37. The end of the piston rod 36 is provided with a transverse pin 36a,b which is shiftably received in longitudinal holes 32a,b in the end 31b of the double lever 31. The double lever 31 is mounted, in a manner in which it is rotatable by means of a rotating pin 33 about centre line S4 (arrows F), on a slide 38. The slide 38 is mounted on a guide means 40 which comprises an upper rod 41a and a lower rod 41b. The position of the slide 38 along the guide means 40 is adjustable, see arrow C. The position of the slide 38 can be secured by means of a non-shown clamping mechanism to be operated by handle 39. The guide means 40 can be mounted on the frame of the rake device 1, as a separate spacer, or be mounted to a side arm of the frame of the device, which side arm carries one or more circular rakes, so that the auxiliary displacing tool 20 will be located at a position which is comparable to that shown in FIG. 1A. The auxiliary displacing tool is thus adjustable in an angular position with respect to S4, by means of the cylinder 35, and in distance with respect to the longitudinal centre line of the longitudinal girder 3. The orientation of rotor centre line R3 is then, when viewed in a top view of the device, also influenced in operative position. Owing to the fact that the mass on the left side (in the figure) of the rotating pin 33 is larger than that on the right side thereof, the transverse pins 36a,b will be supported, during use, against the lower ends of the longitudinal holes 32. The pins 28 will end, during use, at a small distance above the ground surface. When the ground surface forms a small hill and the pins 28 hit that hill, the tool 20 can deviate upwardly due to the possibility for the longitudinal holes 32 to move upwardly with respect to the transverse pins 36a,b, so that the pins 28 and other parts of the auxiliary tool 20 can be prevented from being damaged.

Figure 4:
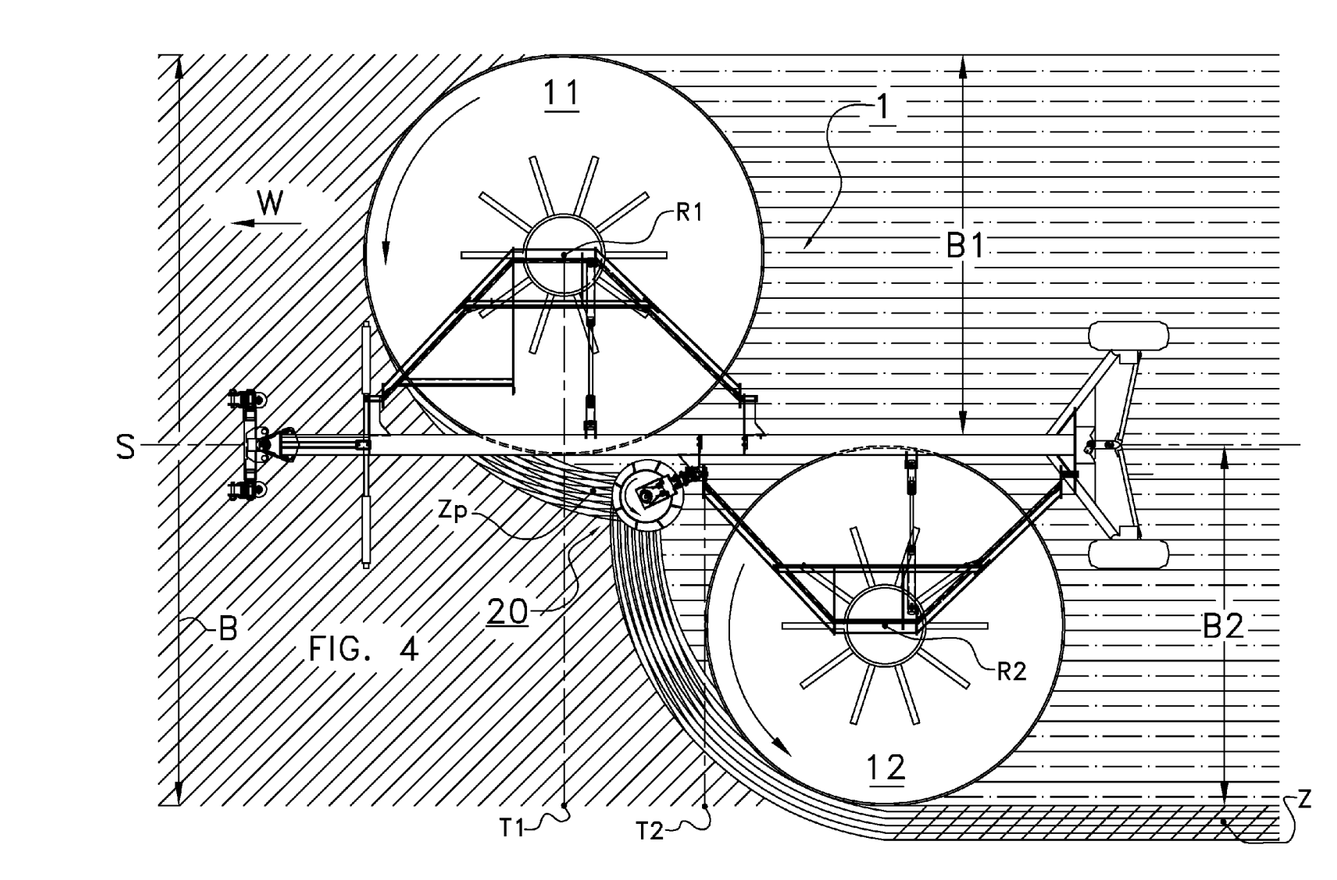
FIG. 4 shows a diagrammatic top view of the device of FIGS. 1A-D during operation.

FIG. 4 shows a use of the device 1. Mown crop, such as grass, lies on the field, in front of the device 1, which is drawn in the direction of travel W by a tractor. The path-shaped working range B of the device is divided into a path section B1, to be worked by circular rake 11, and a path section B2, to be worked by circular rake 12. The circular rake 11 turns to the left and delivers the crop of path section B1 in the surroundings of the longitudinal girder 3. Usually, a pre-windrow would be formed there, which pre-windrow would then be picked up by the second circular rake 12 so as to form an elongate windrow on the left side of the device 1. However, the circular rake 12 should also rake the path section B2, which causes a heavy load and makes high demands on the functioning and the capacity of the circular rake 12. The latter will have to be designed for this purpose and will consequently often differ from the circular rake 11 (rotational speed, number of arms).

Due to the presence of the auxiliary displacing tool 20 (wherein disc 27 with pins 28 is also driven to the left) in the space which is anyhow available, without the length of the device 1 being affected, a large part of the crop displaced by circular rake 11 is thrown across the front of the circular rake 12 to the left side of the path section B2 and thus of the path-shaped working range B. The crop in path section B2 is subsequently also displaced by circular rake 12 to that left side, so that an elongate windrow Z, which is the final windrow for this operating stroke, is formed.

Figure 1D:
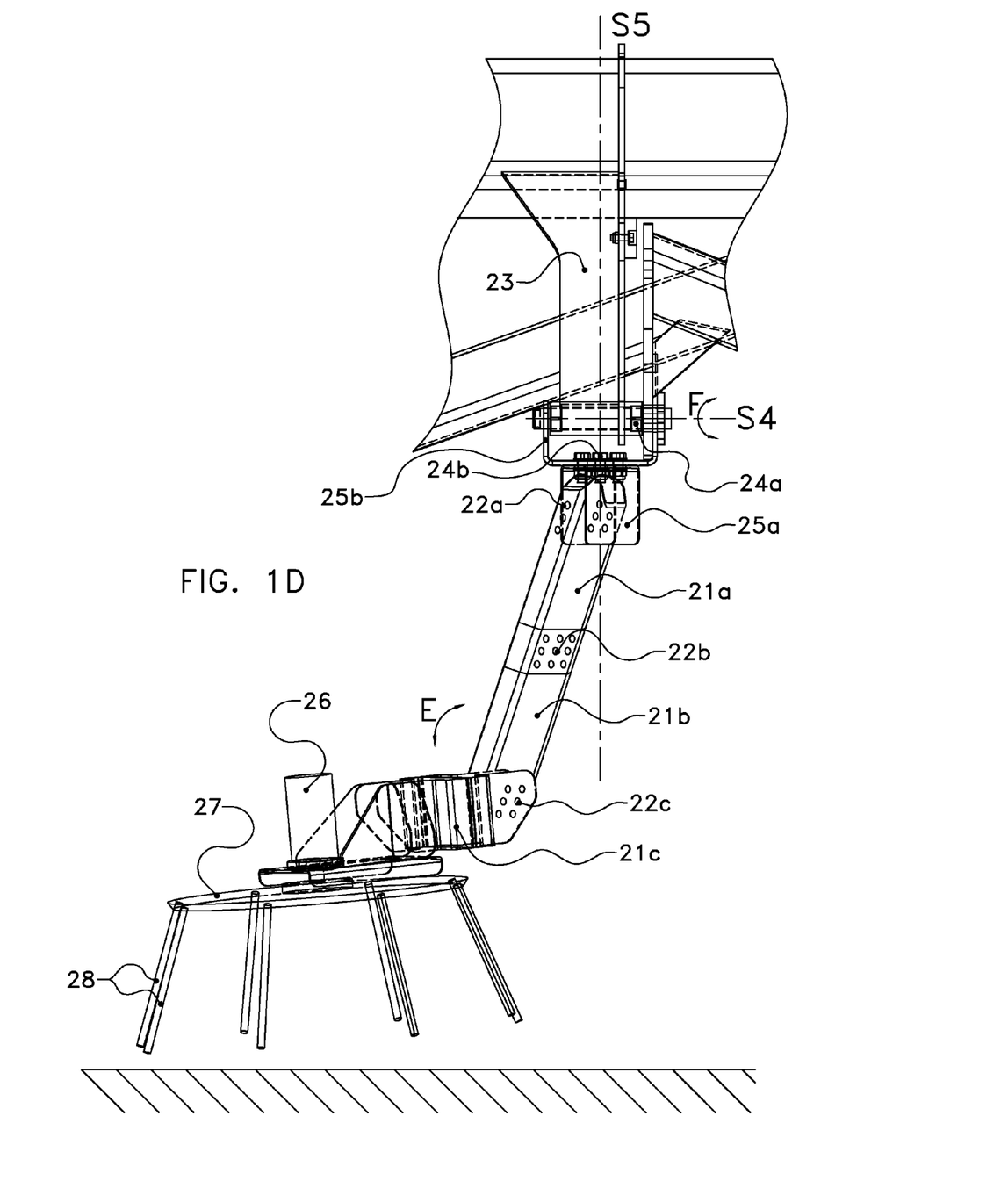

Referring to FIG. 1D (see I D), the design of the auxiliary displacing tool 20, also called thrower or booster, can be selected in function of the requirements, for example related to the length of the stems of the mown crop, the rigidity, etc. The auxiliary displacing tool can also be provided with a cylindrical or drum-shaped rotor with tines or pins (possibly arranged in pairs) which extend radially and tangentially in a plane substantially perpendicular to the rotational centre line of said rotor. The tines remain free from contact with the ground/ground surface. The crop can be engaged by the auxiliary displacing tool when it has reached the ground and forms a pre-windrow (Zp), or just before it touches the ground, and be thrown/swung to the intended windrow, across the front of the immediately next circular rake. The disc 27 is rotated at a relatively high speed, at least some hundreds of rpm, for example in the order of magnitude of 500 rpm, much faster than the rotational speed of the circular rakes.

Figure 5A:
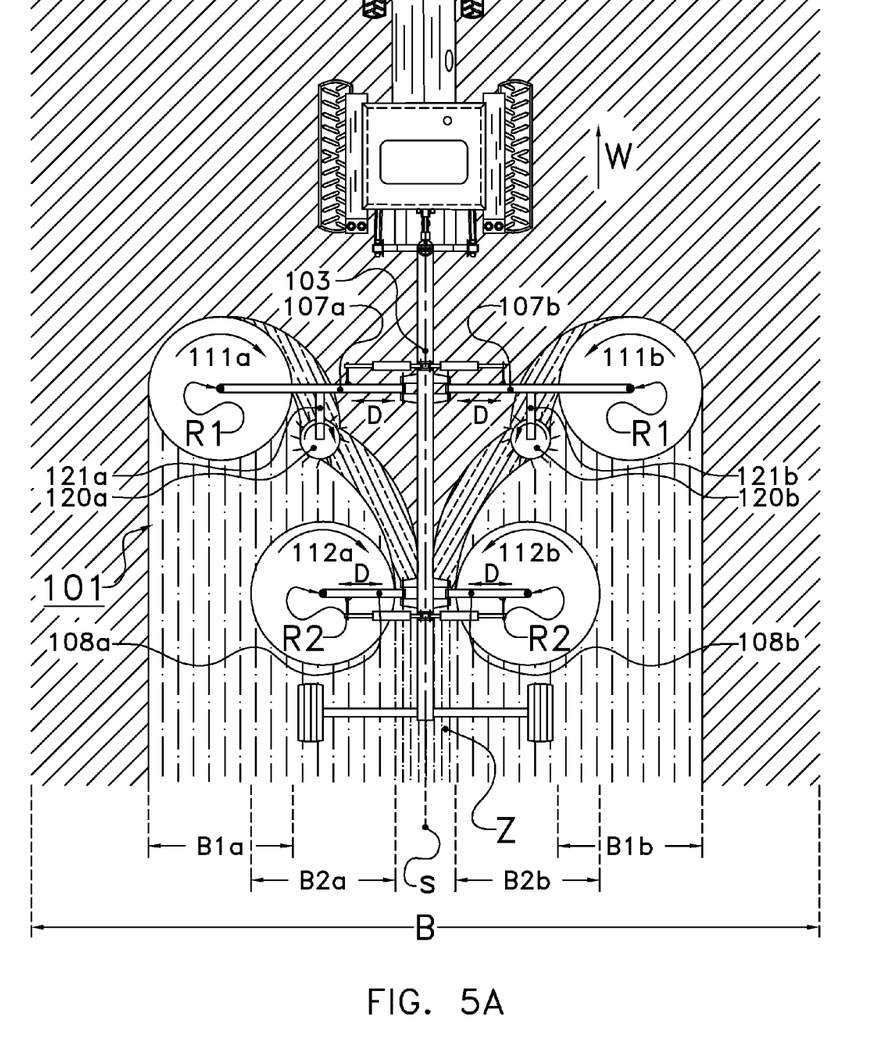
FIGS. 5A and 5B show diagrammatic top views of two possible embodiments of devices according to the invention during operation.

FIG. 5A shows a rake device 101 comprising a frame with a longitudinal girder 103, supported by wheels 105a,b, in a schematic top view. The device 101 comprises four circular rakes 111a,b, 112a,b with equal diameters. The front circular rakes 111a,b are mounted on pivot arms 107a,b, the rear circular rakes 112a,b on pivot arms 108a,b. The position of the circular rakes 111a,b,112a,b along the pivot arms is adjustable, see arrows D. The mutual distance of the rotor centre lines R1,R2 of the circular rakes 111a-112a, 111b-112b can be small (in this case approximately 1¼×the diameter of the circular rakes).

The auxiliary displacing tools or throwers 120a,b correspond to the earlier described auxiliary displacing tools 20 or 20'. They are mounted, by means of carrier arms 121a,b, to the pivot arms 107a,b. The position of the carrier arms 121a,b along the pivot arms 107a,b can be set in a non-shown manner, also in function of the position of the front circular rakes 111a,b with respect to the longitudinal centre line S. For the drive of the auxiliary displacing tools 120a,b, instead of an electric motor, the drive shafts for the circular rakes, which drive shafts are present on the pivot arms 107a,b, can be used, in which case a mechanical transmission transfers the rotation of the drive shafts to the auxiliary displacing tools. The (power take-off) drive of the auxiliary displacing tool can then, upstream (at the proximal side) of an overload coupling in the drive line for the respective circular rake, be coupled to a drive shaft for that circular rake. Said drive shaft can then, for example, drive a belt which drives the rotor of the auxiliary displacing tool.

During operation, the front circular rakes 111a,b rake the path sections B1a and B1b and deliver the raked crop in a flow in the path of the throwers 120a,b located in path section B2, or to said throwers, which throwers throw said crop, across the front of the rear circular rakes 112a,b, to a strip near the longitudinal centre line, to form a final windrow Z. Immediately thereafter, the rear circular rakes 112a,b rake the crop in path sections B2a,B2b and deliver it to the final windrow Z.

Figure 5B:
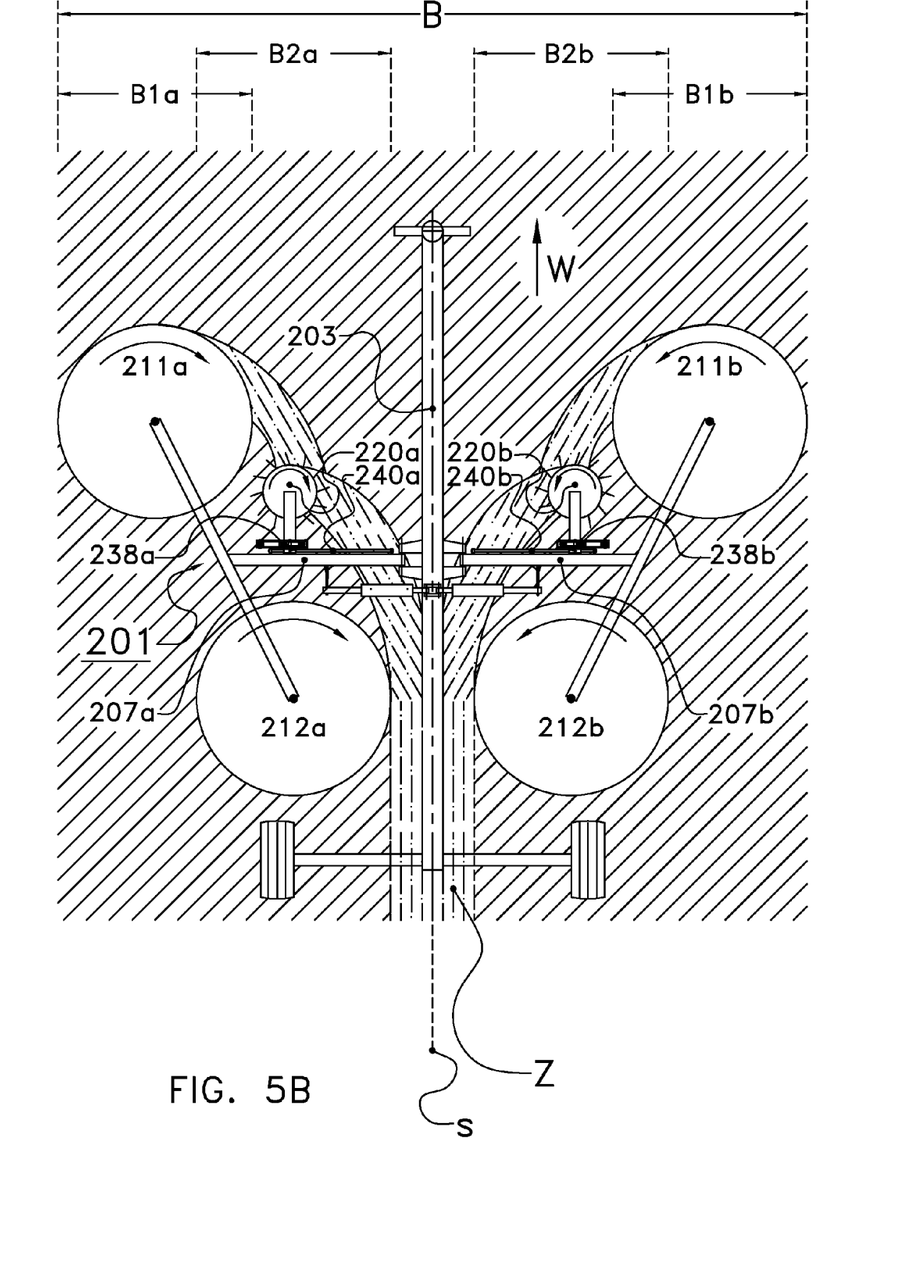

FIG. 5B shows a rake device 201 comprising a frame with a longitudinal girder 203, supported by wheels 205a,b, in a schematic top view. The device 201 comprises four circular rakes 211a,b,112a,b with equal diameters. The circular rakes 211a and 212a and the circular rakes 211b and 212b are mounted on the front ends and the rear ends, respectively, of arms 207a,b which, in their middle, are rotatably mounted about a vertical centre line (directions E) to the ends of pivot arms 150a,b which are upwardly pivotable with respect to the longitudinal girder 203. By setting the angle of the arms 107a,b with respect to the longitudinal centre line S, the relative position of the circular rakes can be set, and thus also the working width.

The auxiliary displacing tools or throwers 220a,b correspond to the auxiliary displacing tools 20 or 20'. The suspension now corresponds to that according to FIG. 3. The guide means 240a,b are mounted along/against the pivot arms 150a, b, so that, by displacing the slides 238a,b, the distance from the throwers 220a,b with respect to the longitudinal centre line can be set, directions C.

During operation, the front circular rakes 211a,b rake the path sections B1a and B1b and deliver the raked crop in a flow in the path of the throwers 220a,b which throw said crop, across the front of the rear circular rakes 212a,b, to a strip near the longitudinal centre line, to form a final windrow Z. Immediately thereafter, the rear circular rakes 212a,b deliver the crop from path sections B2a,B2b to the final windrow Z.

It is pointed out that in FIGS. 5A and 5B, for reasons of clarity, the distance between the rear circular rakes is somewhat larger than will be the case in practice.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A mobile rake device for displacing mown crop, the device comprising a frame with at least one rake tool assembly, wherein the at least one rake tool assembly, when being moved, has a path-shaped working range and comprises two or more rake tools which are provided with rake tines and, in an operative position, are arranged in a sequential, staggered manner in the direction of travel thereby forming a rake tool sequence and wherein each rake tool provides, in the operative position, a path section to achieve the path-shaped working range, wherein the two or more rake tools are provided with a rotor having a rotor point of rotation with a drive for rotation of the rotor around the rotor point of rotation, in the same direction of rotation, and consequently of the rake tines according to associated orbits, in order to displace the mown crop located in the path section in question to one longitudinal side thereof, in a flow of crop, in order to form one final windrow, wherein the at least one rake tool assembly further comprises at least one auxiliary displacing tool that when viewed in a top view in operative position, has a largest horizontal dimension that is smaller than that of any of the rake tools in the rake tool sequence, which the at least one auxiliary displacing tool, when viewed in the direction of travel, is arranged between the rotor points of rotation of two sequential rake tools in the rake tool sequence, and which the at least one auxiliary displacing tool is arranged to throw the crop that has been collected, in a flow of crop or in the form of a pre-windrow, by a first rake tool in the rake tool sequence, across the front of a subsequent rake tool in the rake tool sequence, towards the final windrow to be formed, wherein the at least one auxiliary displacing tool comprises a rotor which is drivable about a rotor centre line and is provided with tines or pins which rotate according to an orbit whose outer diameter is smaller than the outer diameter of the orbit of any of the rake tools in the rake tool sequence.

2. The device according to claim 1, wherein the mutual horizontal distance between the points of rotation of the rotors of two sequential rake tools is smaller than twice the diameter of the orbit of the two or more rake tools.

3. The device according to claim 1, wherein during the operative position, the two or more rake tools are mounted on the frame such that the distance between the outer circumference of their orbits is smaller than the outer diameter.

4. The device according to claim 3, wherein the distance between the outer circumference of their orbits is smaller than the largest radius of the orbit of the two or more rake tools.

5. The device according to claim 1, wherein the at least one auxiliary displacing tool differs in construction from the two or more rake tools.

6. The device according to claim 5, wherein the at least one auxiliary displacing tool is not a rake.

7. The device according to claim 1, wherein the orbit of the tines or pins is smaller than the radius of the orbit of the two or more rake tools.

8. The device according to claim 1, wherein the orbit of the tines or pins is smaller than half the radius of the orbit of the two or more rake tools.

9. The device according to claim 1, wherein the rotational speed of the at least one auxiliary displacing tool is a multiple of that of the rake tools.

10. The device according to claim 9, wherein the rotational speed of the at least one auxiliary displacing tool is at least five to ten times larger than that of the rake tools.

11. The device according to claim 1, wherein, during the operative position, the orbit of the pins of the at least one auxiliary displacing tool, when viewed in a top view, is located entirely within the path section corresponding to the subsequent rake tool.

12. The device according to claim 1, wherein during the operative position, the rotor centre line of the at least one auxiliary displacing tool, when viewed in a top view, is located within the path section corresponding to the subsequent rake tool.

13. The device according to claim 1, wherein the at least one auxiliary displacing tool is provided with an orientation setting mechanism for setting an orientation of the rotor centre line for the at least one auxiliary displacing tool in the operative position thereof.

14. The device according to claim 1, provided with a position setting mechanism to set a position of the at least one auxiliary displacing tool with respect to the first and the subsequent rake tools in operative position, when viewed in a top view.

15. The device according to claim 14, wherein the position setting mechanism of the at least one auxiliary displacing tool is linearly active along an arm of the frame which carries the at least one auxiliary displacing tool.

16. The device according to claim 1, provided with a height setting mechanism of the at least one auxiliary displacing tool with respect to a ground.

17. The device according to claim 1, wherein the pins of the at least one auxiliary displacing tool are designed as tedder pins.

18. The device according to claim 17, wherein the tedder pins have bent ends.

19. The device according to claim 1, wherein the at least one auxiliary displacing tool is suspended from the frame and can be brought into an operative position in which the pins are free from the ground and the entire mass of the at least one auxiliary displacing tool is carried by the frame.

20. The device according claim 1, wherein, in the operative position, the first and the subsequent rake tools are located in a position in which their respective path sections overlap each other, when viewed in a top view.

21. A method of raking mown crop lying scattered on a mowing field, wherein the crop is displaced by a mobile rake device having two or more rake tools arranged in a sequential and staggered manner thereby forming a rake tool sequence and moved along a path, to form one final windrow, wherein the crop is displaced by a first rake tool in the rake tool sequence, in a first path section, to form a pre-windrow located at one side of said first path section, wherein the crop in the pre-windrow is thrown by at least one auxiliary displacing tool mounted on the device, following said first rake tool, across the front of a subsequent rake tool in the rake tool sequence towards the final windrow to be formed, and wherein the at least one auxiliary displacing tool differs in construction from the rake tools in the rake tool sequence and is provided with a rotor, and is further provided with tines or pins which rotate according to an orbit whose outer diameter is smaller than the outer diameter of an orbit of the rake tools in the rake tool sequence.

* * * * *